US006795290B2

(12) United States Patent
Bobert et al.

(10) Patent No.: US 6,795,290 B2

(45) Date of Patent: Sep. 21, 2004

(54) SURGE ARRESTOR

(75) Inventors: Peter Bobert, Falkensee (DE); Klaus-Dieter Fuhrmann, Berlin (DE); Juergen Boy, Berlin (DE)

(73) Assignee: Epcos AG, München (DE)

( * ) Notice: Subject to any disclaimer, the term of this patent is extended or adjusted under 35 U.S.C. 154(b) by 0 days.

(21) Appl. No.: 10/749,036

(22) Filed: Dec. 30, 2003

(65) Prior Publication Data

US 2004/0150937 A1 Aug. 5, 2004

Related U.S. Application Data

(63) Continuation of application No. 10/195,920, filed on Jul. 16, 2002, now Pat. No. 6,710,996.

(30) Foreign Application Priority Data

Jul. 17, 2001 (DE) ........................................ 101 34 752

(51) Int. Cl.[7] ................................................ H02H 1/00

(52) U.S. Cl. ....................................... 361/129; 361/120

(58) Field of Search ................................ 361/117, 118, 361/119, 120, 124, 126, 127, 128, 129, 130; 337/28, 29, 31, 32, 33, 34

(56) References Cited

U.S. PATENT DOCUMENTS

| | | | | |
|---|---|---|---|---|
| 4,984,125 A | | 1/1991 | Uwano | 361/124 |
| 5,313,183 A | | 5/1994 | Kasahara | 337/32 |
| 5,384,679 A | * | 1/1995 | Smith | 361/119 |
| 5,388,023 A | | 2/1995 | Boy et al. | 361/129 |
| 5,633,777 A | | 5/1997 | Boy et al. | 361/120 |
| 5,768,085 A | | 6/1998 | Boy et al. | 361/130 |

FOREIGN PATENT DOCUMENTS

| | | | |
|---|---|---|---|
| CA | 2191409 | 5/1997 | H02H/3/22 |
| DE | G 93 05 796.2 | 7/1993 | H01T/4/08 |
| DE | 43 18 366 | 10/1994 | H01T/4/08 |
| DE | 196 47 748 | 6/1997 | H01T/4/02 |
| DE | 196 47 682 | 7/1998 | H01T/4/10 |
| DE | 199 28 322 | 12/2000 | H01T/4/02 |

* cited by examiner

*Primary Examiner*—Ronald Leja

(74) *Attorney, Agent, or Firm*—Schiff Hardin LLP

(57) ABSTRACT

The invention is directed to a surge arrestor having a middle electrode and at least one outer electrode, in which an electrically conductive spring clip is secured to the middle electrode and exerts a spring power on the outer electrode; in which an electrical component part that is non-conductive at the trigger voltage of the surge arrestor and generates heat given a flow of current is arranged between the spring clip and the outer electrode; in which the spring clip lies against an electrically conductive contact element that is secured to a spacer element using a fusible mass and that is spaced from the outer electrode; and in which, when the fusible mass melts, the contact element is pressed against the outer electrode by the spring clip. The trigger mechanism has the advantage that it reacts very quickly and thereby reduces the formation of sparks and the fire hazard as well.

10 Claims, 3 Drawing Sheets

SURGE ARRESTOR

CROSS-REFERENCE TO RELATED APPLICATIONS

This Application is a continuation of parent application Ser. No. 10/195,920, filed Jul. 16, 2002 now U.S. Pat. No. 6,710,996. The parent application is herein incorporated by reference.

BACKGROUND OF THE INVENTION

1. Field of the Invention

The invention is directed to a surge arrestor having a middle electrode and at least one outer electrode. An electrically conductive spring clip is secured to the middle electrode and exerts a spring force on the outer electrode.

2. Description of the Related Art

Surge arrestors of the type previously described are usually employed for securing telecommunication devices against briefly occurring over-voltages as resulting, for example, from lightning strikes. By triggering the surge arrestor, the outer electrode is shorted to the middle electrode by an arc. As soon as the occurrence of the over-voltage has ended, the arc vanishes and the gap between middle and outer electrode functions as an insulator again.

Arrestors can be equipped with additional functions in order to be able to maintain the previously described protective function even given an outage of a surge arrestor. Mechanisms are known in this context for securing the arrestor given a thermal overload (fail safe) in which a fusible element of solder material or an insulating foil as well is arranged between the spring clip and the outer electrode; this arrangement, given an excessively high temperature, releases the movement of the spring clip which then bridges and, thus, shorts the gap of the arrestor between middle electrode and outer electrode.

Another fault that may occur in an arrestor is the loss of tightness of the arrestor, this resulting in that the trigger voltage of the arrestor rises greatly. The arrestor then no longer triggers at the original trigger voltage and can thus also no longer generate heat that activates the fuse mechanism. In order to also secure the protective function in this situation, the arrestors can be additionally equipped with a fuse given looseness (vent safe). Each spark gap of the arrestor has an additional voltage-limiting component part connected in parallel to it. This can be a varistor or a semiconductor (for example, a break-over diode). This assures that the protective function is preserved even given a malfunctioning or leaking arrestor since, in this case, either the additional, voltage-limiting component part itself protects, shorts the arrestor, or triggers a thermal short-circuit mechanism due to heating.

The highest demands made of the fault-protection mechanisms arise given a leaking arrestor. For example, the American specification Telcordia 1361 prescribes a test in which a leaking 3-electrode arrestor is applied to an alternating voltage of 1000 V at which a maximum current of 30 Amperes per break can flow. In one arrestor version that envisions the use of varistors as voltage-limiting component parts, switching powers of 30 kW per break must be governed. This high electrical power necessarily leads to sparking and burn-up due to arc that harbors a fire hazard sine the arrestor are usually installed in a plastic housing.

U.S. Pat. No. 5,388,023 discloses arrestors of the species initially described in which a fusible element is arranged between the spring clip and the outer electrode. In the normal operating case, the fusible element must prevent a short circuit and, accordingly, must be fashioned in a solid manner with a minimum thickness. In case of a fault, the fusible element releases the electrical contact between the spring clip and the varistor or the outer electrode. This fusible element has a relatively large mass to be fused, as a result of which the transition of the fusible element from the solid into the molten phase lasts a long time and, accordingly, the triggering of the melt fuse is delayed. The risk of sparking thus rises greatly.

SUMMARY OF THE INVENTION

It is therefore an object of the present invention to provide a surge arrestor that provides a fast trigger mechanism in case of a fault.

This object is inventively achieved by a surge arrestor, comprising a middle electrode; an outer electrode; an electrically conductive spring clip secured to the middle electrode and configured to exert a spring force on the outer electrode; an electrical component part arranged between the spring clip and the outer electrode, the electrical component part being non-conductive at a trigger voltage of the surge arrestor and configured to generate heat given a flow of current; a fusible mass; a spacer element; and an electrically conductive contact element that is secured to the spacer element with the fusible mass and that is spaced from the outer electrode, the spring clip lying against the contact element, and the contact element being pressed against the outer electrode by the spring clip when the fusible mass melts. Advantageous developments are described below.

The invention provides a surge arrestor that comprises a middle electrode and at least one outer electrode. An electrically conductive spring clip is secured to the middle electrode and exerts a spring power on the outer electrode. An electrical component part that generates heat given a flow of current is arranged between the spring clip and the outer electrode. The spring clip lies against an electrically conductive contact element that is secured to a spacer element by a fusible mass and that is spaced from the outer electrode. The fusible mass adheres both to the contact element as well as to the spacer element. When the mass melts, the contact element is pressed against the outer electrode by the spring clip.

The inventive surge arrestor has the advantage that the isolation between the spring clip and the outer electrode required in the normal operating case of the arrestor is effected by the spacing of the contact element from the outer electrode by the spacer element. The fusible mass is only required in order to secure the contact element to the spacer element and can therefore be provided in a slight amount that need only assure that the contact element is held by the spacer element.

The electrical component part thus insulates at the trigger voltage that the arrestor has in normal operation.

In an advantageous embodiment of the invention, the electrical component part can be a varistor. Given standard, static trigger voltages of approximately 350 V of arrestors that are present during normal operation, such a varistor still has a high impedance of approximately 0.5 MΩ, so that it practically represents an insulation between the spring clip and the outer electrode. In case of over-voltage, however, the resistance of the varistor is diminished, so that the protective function can be assumed by the varistor in case the trigger voltage of the arrestor rises to extremely high values (>1000 V) due to a fault in the arrestor. Over and above this, a varistor is an electrical component that generates heat when current flows and can itself therefore trigger a thermal protective mechanism.

In another embodiment of the invention, however, the component part can be a semiconductor component.

In one embodiment of the surge arrestor, the spring clip and the contact element are two different component parts, where the spring clip lies against the contact element and thus presses it against the outer electrode.

In another embodiment, the contact element is integrated as one piece in the spring clip. Here, too, the spring clip lies against the contact element since contact element and spring clip directly adjoin one another.

In one embodiment of the invention, the spacer element is in the form of a pin. The contact element comprises a disk that has a hole into which the spacer element projects.

This embodiment of the invention has the advantage that it can be especially easily and simply manufactured. The fastening of the contact element to the spacer element can, given a corresponding dimensioning of the pin or hole, be produced with a very slight amount of fusible compound, this yielding the advantage of a fast trigger mechanism.

In another embodiment of the invention, the spring clip likewise comprises a hole through which the spacer element projects when the compound has melted. This avoids impeding the trigger mechanism due to a mechanical contact between the spring clip and the spacer element. Depending on the fashioning of the spacer element, the spacer element can already project through the hole in the spring clip even when the compound has not yet melted.

In another embodiment of the invention, the spacer element comprises a taper in a section lying between the contact element and the outer electrode. This taper has the advantage that, when the compound melts, the motion of the contact element along the pin-shaped spacer element is not impeded by excessively slight spacings between the inside edge of the hole of the contact element and the spacer element, this promoting the design of a very fast protective mechanism. As a result of the hole in the contact element through which the spacer element projects, the spacer element can also be advantageously used for guiding, fixing and aligning the contact element.

In another advantageous embodiment of the invention, the electrical component part is arranged between the outer electrode and the spacer element. As a result, an arc arising in the electrical component part can be prevented from penetrating toward the outside given overload of the component part.

In an advantageous embodiment of the invention, the fusible mass can be fashioned as solder. In conjunction with solderable materials for the contact element and the spacer element, a very simple connection between contact element and spacer element is thus possible. Moreover, the tin alloys employed for solder assure that the connection between the contact element and the spacer element is quickly undone given adequate heat.

In another embodiment of the invention, the contact element comprises a disk that has its disk edge provided with a collar extending in the direction toward the outer electrode. Such a collar, within which the electrical component part is especially advantageously arranged, can additionally effectively reduce the arc-over of sparks from the electrical component part to conductive objects outside the electrical component part. Such a disk with collar can be especially advantageously implemented in the form of a cap.

The contact space between the varistor and the electrically conductive spacer element can also be covered with the assistance of the collar. This contact space is required as long as the electrical component part assumes the voltage-limiting function. The varistors usually employed as an electrical component part, however, cannot handle the same electrical power or the same high currents as the surge arrestor. Given longer-lasting over-voltages or given extremely high over-voltages, the varistor is very quickly destroyed by a breakdown, resulting in the heat triggering the fuse mechanism. Maximally, thus, the varistor represents a short-duration protection given smaller over-voltages or over-currents.

In another embodiment of the invention, an outside surface of the electrical component part can be covered with a shrink hose. This reduces sliding discharges and, likewise, the formation of sparks at the outside of the electrical component part.

A shrink hose can also be arranged on the outside surface of the collar, this shrink hose additionally covering the contact space formed between the electrical component part and the spacer element.

Such a shrink hose, moreover, reduces the delivery of oxygen to the contact element and, thus, the risk of sparking. Furthermore, this also effectively diminishes the risk of a lateral short-circuit between the contact element and the outer electrode.

A shrink hose at the outside surface of the collar is significant when, in another embodiment of the invention, the outer electrode comprises a ring at its edge that is composed of an iron-nickel alloy. The outer electrode projects very far in the direction of the contact element through this ring, the risk of a lateral short-circuit increasing as a result and the arrangement of a shrink hose at an outside surface of the collar being thus especially advantageous.

The ring at the outer edge of the outer electrode has the advantage that the different coefficients of thermal expansion that represent a disturbing factor when soldering the outer electrode onto the small ceramic tube usually employed as a component body can be compensated by occupying that side of the outer electrode lying opposite the small ceramic tube with a material that is similar to the small ceramic tube.

DESCRIPTION OF THE DRAWINGS

The invention is explained in greater detail below on the basis of exemplary embodiments and the appertaining Figures.

DETAILED DESCRIPTION OF THE INVENTION

Figure 1:
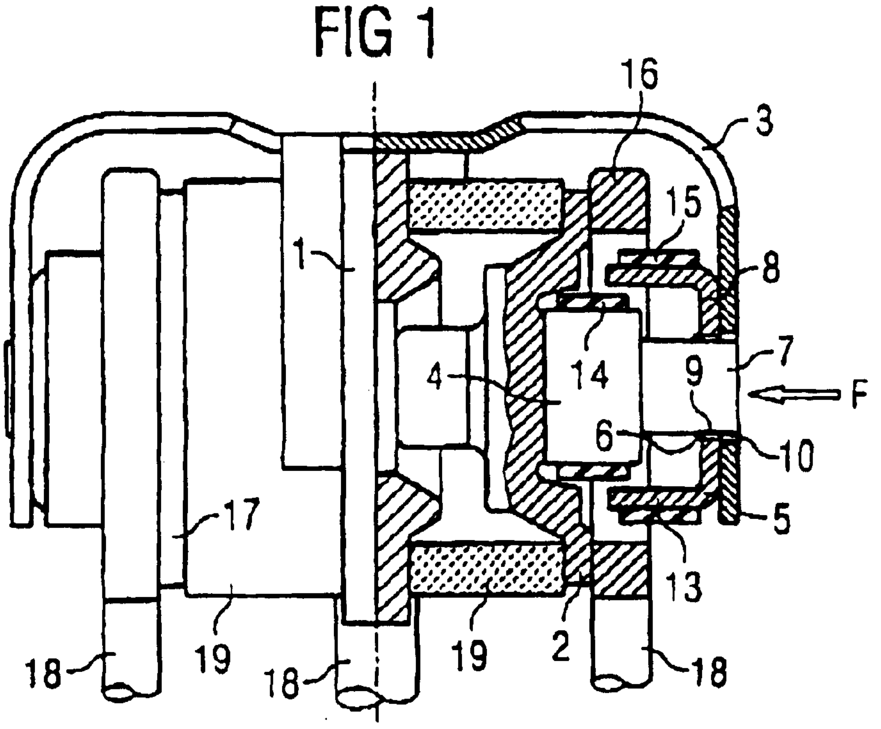
FIG. 1 is a plan/schematic cross sectional side view showing an inventive surge arrestor by way of example in a condition in which the safety mechanism has not been triggered.

FIG. 1 shows a surge arrestor with a ceramic body 19 at whose outer ends outer electrodes 2, 17 are arranged. A middle electrode 1 is also arranged between two ceramic bodies 19. The middle or outer electrodes 1, 2, 17 are joined to the ceramic bodies 19 by soldering. In order to compensate the differences in the coefficients of thermal expansion of the ceramic bodies 19 and the outer electrodes 2, 17, which are usually composed of copper, a ring 16 that is composed of an iron-nickel alloy is respectively arranged at the outsides of the outer electrodes 2, 17. In addition to the matching of the coefficients of thermal expansion when soldering the outer electrodes 2, 17 onto the ceramic bodies 19, this ring also has the advantage that it is more resistant to burn-off than the copper employed for the outer electrodes 2, 17.

A spring clip 3 is secured to the middle electrode 1, this spring clip 3 overlapping onto the end face of the outer electrode 2 and exerting a spring force F on this outer electrode 2. The spring clip 3 is held by a contact element 5 that is secured to a spacer element 7. The spacer element 7 has the shape of a round pin that projects through a round hole 9 in the contact element 5. The mechanical connection between the spacer element 7 and the contact element 5 is produced by a fusible mass 6 along the edge of the hole of the contact element 5. The fusible mass 6 is advantageously selected as solder. The spacer element 7 is pressed against an electrical component (a varistor) 4 by the spring clip 3. A shrink hose 14 is arranged at the outside of the electrical component 4. The contact element 5 is fashioned as a cap that comprises a floor in the form of a disk 8 and a collar 13 arranged at the edge of the disk 13. In particular, the collar 13 can be fashioned of one piece. A shrink hose 15 is arranged at the outside of the collar 13. The spring clip 3 likewise comprises a hole 10 through which the spacer element 7 projects. The spring clip 3 is held by the contact element 5 secured to the spacer element 7. This is the case as long as the fusible mass 6 is hard and promotes the mechanical contact between the contact element 5 and the spacer element 7. The spring clip 3, the contact element 5 and the spacer element 7 are designed such that the spring clip 3 and the contact element 5 can slide along the spacer element 7 when the fusible mass 6 becomes molten.

The shrink hoses 14, 15 are composed of electrically insulating material. The electrical component 4 is arranged within a space that is covered toward the outside by the collar 13 and the ring 16. The risk of spark-overs is thus reduced.

The spring clip 3 can, for example, be fabricated of spring steel. The contact element 5 and the spacer element 7 may be advantageously fabricated of sheet steel. Leads 18 that are electrically conductively connected to the middle electrode 1 and the outer electrodes 2, 17 are provided for contacting the surge arrestor.

Figure 2:
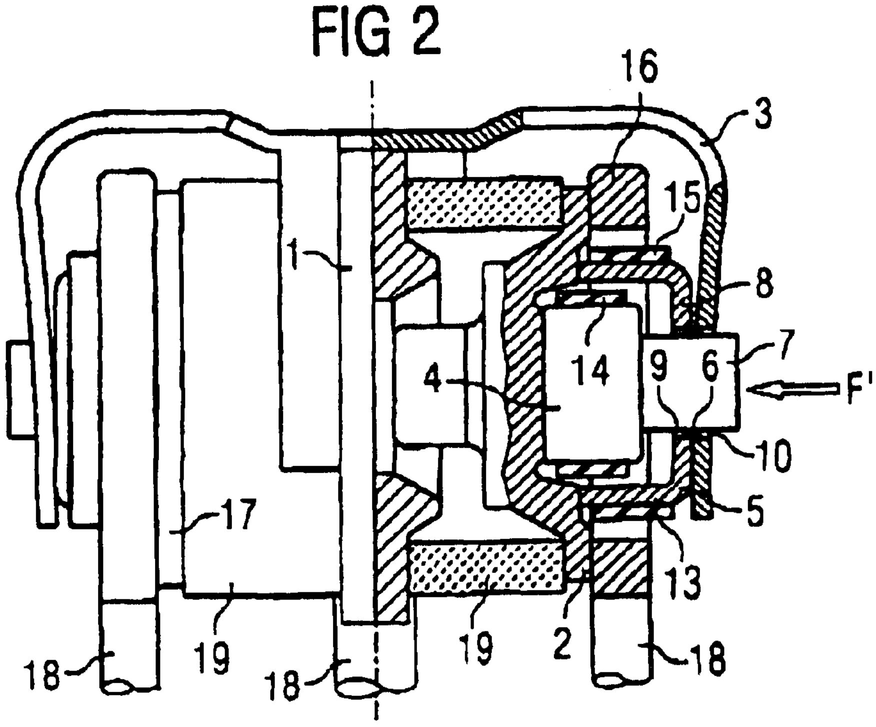
FIG. 2 is a plan/schematic cross sectional side view showing the surge arrestor of FIG. 1 in a condition in which the safety mechanism has triggered.

FIG. 2 shows a surge arrestor according to FIG. 1 in which corresponding elements are referenced with corresponding reference characters. The protective mechanism has been triggered in the condition of the surge arrestor shown in FIG. 2. Due to the melting of the fusible mass 6, the contact element 5 has been pressed by the spring clip 3 in the direction onto the outer electrode 2. Using a corresponding design of the dimensions of the elements active in the protective mechanism, the spring clip 3 displaces the contact element 5 so far in the direction toward the outer electrode 2 that the contact element 5—exerting a contact pressure that in turn derives from the spring clip 3 (residual spring force F')—presses against the outer electrode 2. This triggers the short-circuit mechanism by the electrical contacting of the outer electrode 2 with the spring clip 3 and, thus, with the middle electrode 1.

As soon as the short-circuit mechanism between the middle electrode 1 and the outer electrode 2 has triggered, current no longer flows through the electrical component 4 and heat is also no longer generated. The fusible mass 6 is therefore shown in a solid state again in FIG. 2.

Figure 3:
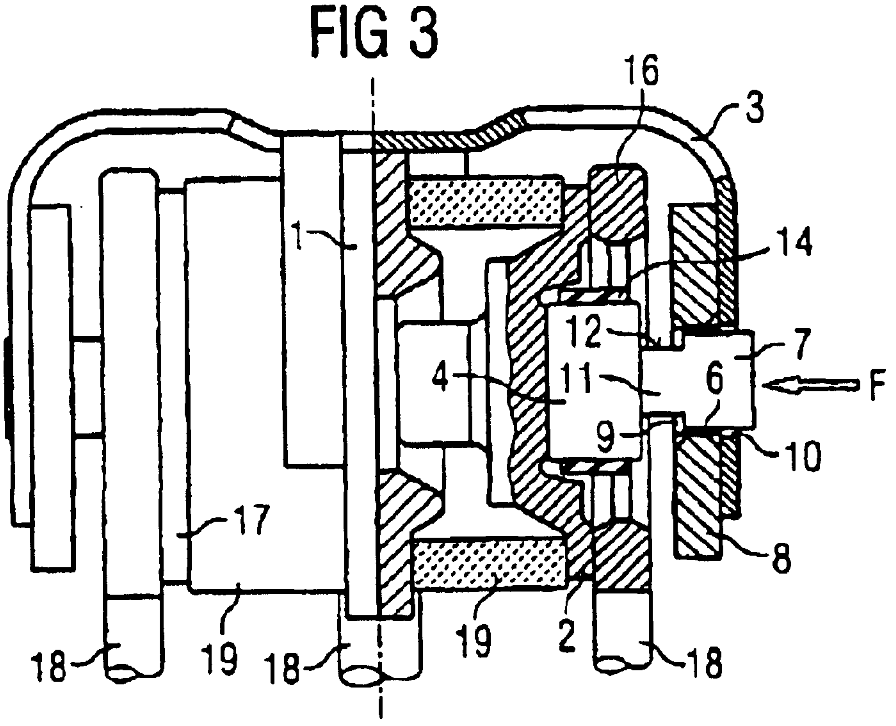
FIG. 3 is a plan/schematic cross sectional side view showing a further inventive surge arrestor by way of example in a condition in which the safety mechanism has not triggered.

FIG. 3 shows a surge arrestor that is similar to the surge arrestor shown in FIG. 1. Corresponding elements are therefore referenced with the same reference characters. The design of FIG. 3 differs from that of FIG. 1 in that the surge arrestor according to FIG. 3 has a contact element 5 that comprises the shape of a disk 8. Such a disk 8 is easier to manufacture than the cap shown in FIG. 1, permitting an especially cost-beneficial manufacture of the surge arrestor shown in FIG. 3. The covering of the electrical component 4, however, is less pronounced than in FIG. 1. The contact element 5 is secured to the spacer element 7 with the fusible mass 6. The spacer element 7 comprises the shape of a round pin that, differing from FIG. 1, comprises a taper 12 in a section 11 that lies between the contact element 5 and the outer electrode 2. This taper 12 allows an especially easy motion of the contact element 5 in the direction onto the outer electrode 2 when the safety mechanism triggers since the clearance between the spacer element 7 and the inside edge of the hole 9 of the contact element 5 is enlarged. The rapidity of the trigger mechanism is thus improved further.

Figure 4:
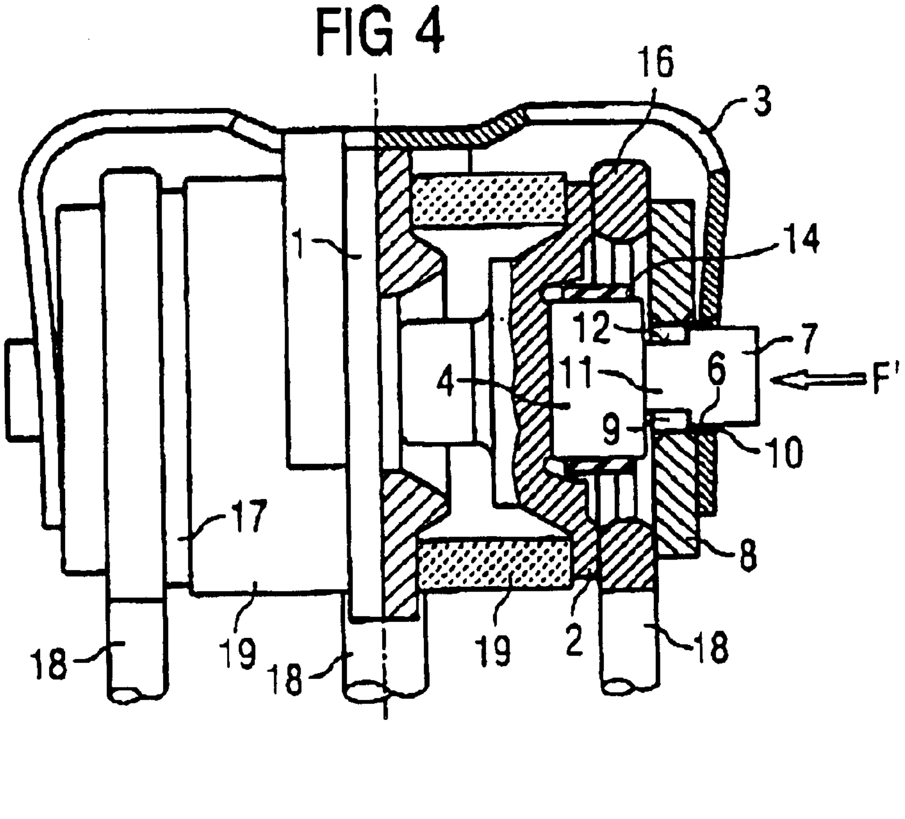
FIG. 4 is a plan/schematic cross sectional side view showing the surge arrestor of FIG. 3 in a condition in which the short-circuit mechanism has triggered.

FIG. 4 shows the surge arrestor of FIG. 3 in a condition wherein the safety mechanism has triggered. The spring clip 3 exhibits a residual spring force F' that presses the contact element 5 onto the ring 16 and thus produces an electrical contact between the middle electrode 1 and the outer electrode 2. The ring 16 is electrically conductive, just like the contact element 5 and the spring clip 3. In order to offer an effective and fast trigger mechanism, it is advantageous when the spring clip 3 is designed such that it presses against the outer electrode 2 with a force F of approximately 30 through 40 Newton. The specific arrangement of the spacer element 7 that is pressed against the electrical component 4 can particularly serve for blocking arcs arising in the electrical component 4.

Figure 5:
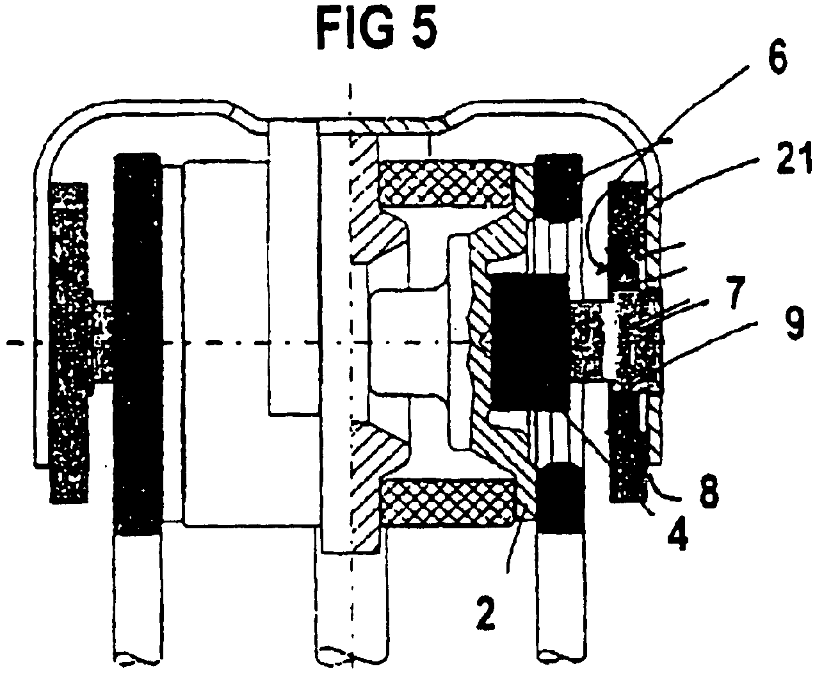
FIG. 5 is a plan/schematic cross sectional side view showing another embodiment of a surge arrestor.

FIG. 5 shows a surge arrestor that is similar to the surge arrestor shown in FIG. 4. Differing from FIG. 4, the surge arrestor of FIG. 5 does not comprise a shrink hose 14 over the electrical component 4. Additionally, this disk 8 is provided with a hole 9 that comprises an expansion 21 in the direction toward the outer electrode 2. The hole 9 has contact with the fusible mass 6 over its entire length. The expansion 21 is filled with a fusible mass 6. The expansion 21 offers the advantage that, when the fusible mass 6 melts, a rapid movement of the disk 8 along the spacer element 7 can ensue without any risk of a hang-up between spacer element 7 and disk 8 in the front part of the disk 8 that would retard the triggering of the safety mechanism.

Figure 6:
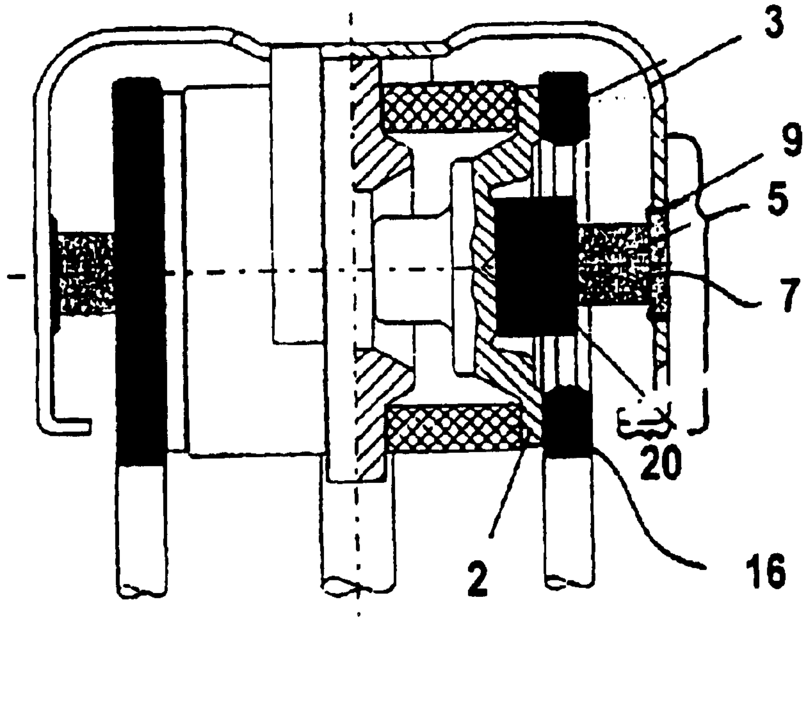
FIG. 6 is a plan/schematic cross sectional side view showing a further embodiment of a surge arrestor.

FIG. 6 shows a surge arrestor in a schematic longitudinal section where the contact element 5 is fashioned as part of the spring clip 3. In particular, the lower end of the contact element 5 comprises an inwardly bent section 20 that, when the fusible mass 6 melts, contacts the ring 16 and the outer electrode 2 as well due to the spring force of the spring clip 3. According to FIG. 6, the contact element 5 comprises a section that is provided with a hole 9. The contact element 5 is connected to the spacer element 7 in the inside of the hole 9 by the fusible mass 6.

The described safety mechanism is, of course, not limited to the protection of only a break between the middle electrode 1 and the outer electrode 2. As also shown in FIGS. 1 through 4, the second break between the middle electrode 1 and the further outer electrode 7 can be protected in a corresponding way by a symmetrical addition.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

List of Reference Characters

1 middle electrode
2 outer electrode
3 spring clip
4 electrical component
5 contact element
6 fusible mass
7 spacer element
8 disk
9 hole
10 hole
11 section
12 taper
13 collar
14,15 shrink hose
16 ring
17 further outer electrode
18 lead
19 ceramic body
20 section
21 expansion
F spring power
F' residual spring power

What is claimed is:

1. A surge arrestor, comprising:

a middle electrode;

at least one outer electrode;

an electrically conductive spring clip that is secured to the middle electrode and exerts a spring power on the at least one outer electrode, an electrical component part that is non-conductive at a trigger voltage of the surge arrestor, configured to generate heat given a flow of current, the electrical component part being arranged between the spring clip and the at least one outer electrode, a spacer element to which the spring clip is secured with a fusible mass, the spring clip being spaced away from the outer electrode, the spacer element having a tapering at a section lying between the outer electrode and the spring clip, the elements being so arranged that when the fusible mass becomes molten, the spring clip is pressed against the at least one outer electrode.

2. The surge arrestor according to claim 1, in which the spring clip comprises a hole, the spacer element being attached to the spring clip inside the hole.

3. The surge arrestor according to claim 1, further comprising:

an enlarged free space between the spacer element and the spring clip provided by the tapering upon release of the spring clip.

4. The surge arrestor according to claim 1, wherein the electrical component part is arranged between the at least one outer electrode and the spacer element.

5. The surge arrestor according to claim 1, wherein the fusible mass is made of solder.

6. The surge arrestor according to claim 1, further comprising a shrink hose that covers an outside surface of the electrical component part.

7. A surge arrestor according to claim 1, wherein the at least one outer electrode comprises a ring at its edge that is composed of an iron-nickel alloy.

8. The surge arrestor according to claim 1, wherein the spring clip is composed of a spring steel.

9. The surge arrestor according to claim 1, wherein the electrical component part is a varistor or a semiconductor component.

10. The surge arrestor according to claim 1, wherein the spring clip comprises an inwardly bent section at its end.

* * * * *